US010933971B2

(12) United States Patent
Woodworth et al.

(10) Patent No.: US 10,933,971 B2
(45) Date of Patent: Mar. 2, 2021

(54) INJECTION MOLDED WING STRUCTURE FOR AERIAL VEHICLES

(71) Applicant: X Development LLC, Mountain View, CA (US)

(72) Inventors: Adam Woodworth, Mountain View, CA (US); Adem Rudin, Mountain View, CA (US); Stephen Benson, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 429 days.

(21) Appl. No.: 15/836,782

(22) Filed: Dec. 8, 2017

(65) Prior Publication Data

US 2019/0176958 A1 Jun. 13, 2019

(51) Int. Cl.
*B64C 3/24* (2006.01)
*B64C 3/18* (2006.01)
*B64C 29/02* (2006.01)
*B64C 39/02* (2006.01)

(52) U.S. Cl.
CPC ............... *B64C 3/24* (2013.01); *B64C 3/18* (2013.01); *B64C 29/02* (2013.01); *B64C 39/024* (2013.01)

(58) Field of Classification Search
CPC .......... B64C 3/18; B64C 3/182; B64C 3/185; B64C 3/187; B64C 3/24
See application file for complete search history.

(56) References Cited

U.S. PATENT DOCUMENTS

| | | | |
|---|---|---|---|
| 2006/0249626 A1 | 11/2006 | Simpson et al. | |
| 2007/0102584 A1 | 5/2007 | Christianson et al. | |
| 2012/0292435 A1 | 11/2012 | Karen | |
| 2013/0228645 A1* | 9/2013 | Van Speybroeck | ... B64C 39/028 244/13 |
| 2016/0297520 A1* | 10/2016 | Sada-Salinas | ......... B64D 17/80 |
| 2017/0081015 A1 | 3/2017 | Charles | |

FOREIGN PATENT DOCUMENTS

KR 10-2014-0292435 8/2014

OTHER PUBLICATIONS

International Searching Authority, International Search Report and Written Opinion dated Apr. 5, 2019, issued in connection with International Patent Application No. PCT/US2018/064696, filed on Dec. 10, 2018, 13 pages.

* cited by examiner

*Primary Examiner* — Nicholas McFall
(74) *Attorney, Agent, or Firm* — McDonnell Boehnen Hulbert & Berghoff LLP

(57) ABSTRACT

An example method of manufacturing a wing includes providing a wing frame. The wing frame includes a primary spar, a drag spar, a plurality of transverse frame elements having at least one spar joiner, and a plurality of mounting elements. The primary spar is coupled to the drag spar via the at least one spar joiner. The method further includes placing the wing frame into a mold, wherein the mold defines a shape of the wing. The method also includes injecting the mold with an air-filled matrix material, such that the air-filled matrix material substantially encases the wing frame and fills the defined shape of the wing, and such that the plurality of transverse frame elements provide torsional rigidity to the wing.

11 Claims, 13 Drawing Sheets

INJECTION MOLDED WING STRUCTURE FOR AERIAL VEHICLES

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

Unmanned aerial vehicles may be used for recreational purposes or for utilitarian purposes. Generally, unmanned aerial vehicles are limited in their usefulness by battery life, range, power, durability, and price of materials. Unmanned aerial vehicles that are designed for recreational purposes may lack the structural integrity and power required to perform useful tasks such as delivering many types of goods. Conversely, unmanned aerial vehicles that are designed for utilitarian purposes may lack sustainable battery life, range, and cost-effectiveness as a result of adding more durable and powerful, yet heavier, components.

SUMMARY

Described herein are systems related to aerial vehicles, including unmanned aerial vehicles (UAVs), as well as methods of manufacturing such aerial vehicles or components thereof. In example embodiments, a wing structure for an aerial vehicle may be manufactured by injecting material into a mold containing a pre-assembled wing frame, such that the material cures around the pre-assembled frame to form a wing structure that substantially encases the wing frame. With this arrangement for manufacture, the wing frame can be fixedly encased in a single piece of the material.

In one example, a method of manufacturing a wing is provided that includes providing a wing frame. The wing frame includes a primary spar, a plurality of transverse frame elements having a spar joiner, and a plurality of mounting elements. The primary spar is coupled to the drag spar via the spar joiner. The method further includes placing the wing frame into a mold, wherein the mold defines a shape of the wing. The method also injecting the mold with an uncured material. The method additionally includes allowing the uncured material to cure to form an air-filled matrix material, such that the air-filled matrix material substantially encases the wing frame and fills the defined shape of the wing, and such that the plurality of transverse frame elements provide torsional rigidity to the wing.

In another example, a wing is provided that includes a wing frame, wherein the wing frame comprises a primary spar, a plurality of transverse frame elements coupled to the primary spar, and a plurality of mounting elements. The wing also includes a body, wherein the body comprises an air-filled matrix material. In the example wing, the wing frame is fixedly encased in a single piece of the air-filled matrix material of the body such that the plurality of transverse frame elements provide torsional rigidity to the wing and such that separating the encased wing frame from the body has an internecine effect.

In another example, an unmanned aerial vehicle (UAV) is provided that includes a wing, a fuselage, a plurality of booms coupled to the wing, and a plurality of propellers coupled to the plurality of booms. In the example UAV, the wing comprises a frame and a body. The wing frame includes a primary spar, a plurality of transverse frame elements coupled to the primary spar, and a plurality of mounting elements. The body includes an air-filled matrix material. Further, the wing frame is fixedly encased in a single piece of the air-filled matrix material of the body such that the plurality of transverse frame elements provide torsional rigidity to the wing and such that separating the encased wing frame from the body has an internecine effect.

In another example, a system is provided that includes means for assembling a wing frame, wherein the wing frame comprises a primary spar, a plurality of transverse frame elements, and a plurality of mounting elements, wherein assembling the wing frame comprises coupling the primary spar to the transverse frame elements. The system further includes means for placing the assembled wing frame into a mold, wherein the mold defines a shape of the wing. The system also includes means for injecting the mold with an uncured material. The system additionally includes means for allowing the uncured material to cure to form an air-filled matrix material, such that the air-filled matrix material substantially encases the wing frame and fills the defined shape of the wing, and such that the plurality of transverse frame elements provide torsional rigidity to the wing.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
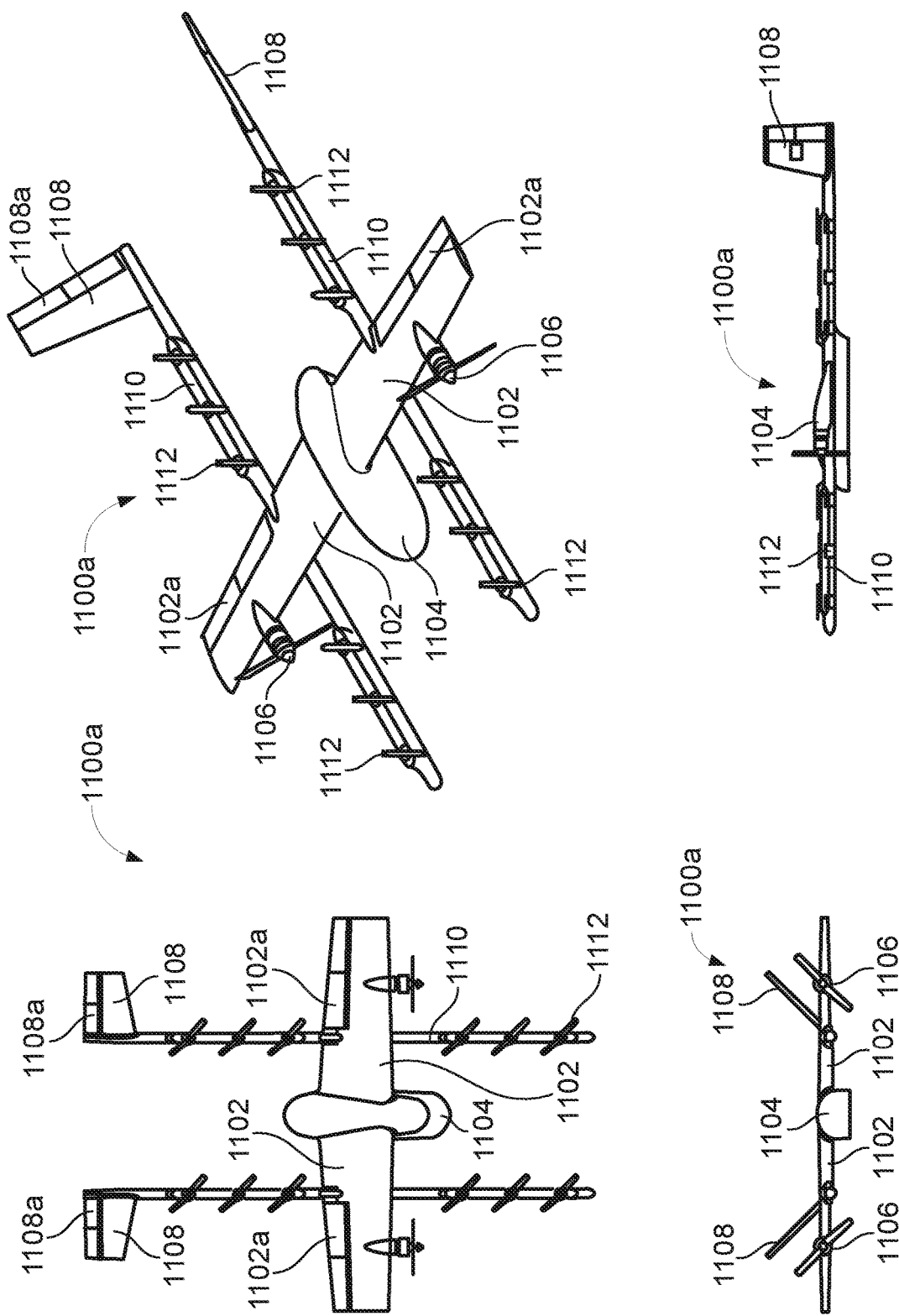
FIG. 1A is a simplified illustration of an unmanned aerial vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Example embodiments may include or otherwise relate to wing structures for use in manned and/or unmanned aerial vehicles, as well as methods of manufacturing such wing structures. In example embodiments, the wing structure may include a wing frame and a body. The wing frame may include a primary spar and transverse frame elements coupled to the primary spar. The body may be formed from an air-filled matrix material, such as foam, that substantially encases the wing frame. Further, the body may be a single structure that includes a center portion and two wings extending therefrom. In practice, the center portion may serve as the aerial vehicle's fuselage, or may be integrated in or attached to the fuselage.

In example methods of manufactures, the wing frame may be placed into a mold, and the mold may be injected with an uncured material. The mold may define a shape of the wing. The uncured material may cure, and while curing may expand to form an air-filled matrix material that substantially encases the wing frame and fills the shape of the wing defined by the mold. Molding the wing frame along with the uncured material may save time in manufacturing the wing, and may allow for a sturdy, yet lightweight wing. After curing, the uncured material may be referred to as an "air-filled matrix material," The air-filled matrix material, in conjunction with the transverse frame elements, may provide tortional stability to the wing structure by translating forces from the surface of the wing structure to the transverse frame elements, which in turn may translate the forces to the spar.

Including the wing frame in the mold may allow for the injected uncured material to substantially encase the wing frame such that, once the uncured material has cured, the frame and body of the wing structure form a single piece. The frame and body, so manufactured, may be substantially inseparable. Separating the frame from the body, once the uncured material has cured to form an air-filled matrix material, may have an internecine effect on the wing. That is, separating the wing frame from the wing body may have a mutually destructive effect. For example, the frame may be distorted or broken, one or more of the transverse frame elements may become uncoupled from the primary spar, or cells of the air-filled matrix material may be rended, torn or broken. Other internecine effects are possible as well.

Molding the wing frame along with the wing body may also allow for easy incorporation of additional features of an aerial vehicle. For example, a portion of a fuselage of the aerial vehicle may be molded along with the wing. In some examples, a battery housing may be incorporated into the wing. In other examples, an avionics hub may be incorporated. In still other examples, transceiver pockets may be included. In these examples, the wing structure may include recesses that allow for the additional components to be incorporated after the wing structure has been molded and the air-filled matrix material has cured. However, some or all of these components may be alternatively incorporated during molding of the wing.

In some examples, the additional features may be comolded with the wing frame. For example, a printed circuit board (PCB) may be molded along with the wing frame. In other examples, a battery housing may be comolded with the wing frame. In still other examples, sensors and electrical systems may be incorporated with the wing frame prior to molding and comolded with the wing frame. Sensors and electrical systems that are incorporated into the wing may be molded such that electrical leads of one or more of the sensors and electrical systems are exposed after molding. The exposed leads may be coupled to additional electrical components after molding.

In other examples, mounting elements may be incorporated into the wing frame, allowing for additional features of the aerial vehicle to be attached after the uncured material has cured to form an air-filled matrix material. The additional features may benefit from the stability of the wing frame, as translated by the mounting elements. Additionally, the mounting elements may allow for improved modularity in the aerial vehicle design. For example, the mounting elements may include a plurality of boom joiners that are couplable to one or more booms of the aerial vehicle. The booms may be inserted into the boom joiners or otherwise coupled to the wing frame via boom ports of the wing structure. The booms may have additional components, such as electrical components and protective coverings that are installed after incorporation into the wing. In these examples, the mounting elements may be substantially surrounded by the air-filled matrix material but may yet be couplable to the additional elements.

In further examples, the mounting elements may include one or more electrical component mounts. For example, the electrical component mounts may allow a voltage suppressor to be connected to the molded and cured wing. In other examples, the electrical component mounts may allow for one or more sensors to be connected to the molded and cured wing structure. In these examples, the mounting elements may poke through the surface of the air-filled matrix material, such that additional components may be snapped, soldered, or otherwise coupled to the wing.

While injecting the mold, the mounting elements may be shielded from the uncured material as it cures. For example, a plug can be used during molding, such that a recess exists after the uncured material cures and the plug is removed. This way, though the wing frame is substantially encased by the resulting air-filled matrix material, the mounting elements may be accessible to additional features of the aerial vehicle. In other examples, an intermediary material may shield the mounting elements from the uncured material as it cures. This way, when the wing structure is removed from the mold, the intermediary material may be removed, exposing the mounting elements. Other ways of shielding the mounting elements are possible as well.

In still further examples, the transverse frame elements may include a plurality of spar joiners coupled to the primary spar. The spar joiners may connect the primary spar to one or more secondary spars. For example, the spar joiners may connect the primary spar to a drag spar. In this example, the spar joiners may translate drag loads from the drag spar to the primary spar. In other examples, the transverse frame elements may include ribbed features. The ribbed features may be tangentially oriented to an airfoil of the wing. For example, the ribbed features may substantially span a leading edge of the wing structure to a trailing edge of the wing structure.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. ILLUSTRATIVE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing various views of a UAV, according to an example embodiment. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other embodiments, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn left or right) during flight. In some embodiments, the UAV 1100a may be also be configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1110 may be used during a hover mode wherein the UAV 1110a is descending to a delivery location, or ascending following a delivery. In the example UAV 1100a, stabilizers 1108 are shown attached to the rotor supports 1110.

During flight, the UAV 1100a may control the direction and/or speed of its movement by controlling its pitch, roll, yaw, and/or altitude. For example, the stabilizers 1108 may include one or more rudders 1108a for controlling the UAV's yaw, and the wings 1102 may include one or more elevators for controlling the UAV's pitch and/or one or more ailerons 1102a for controlling the UAV's roll. As another example, increasing or decreasing the speed of all the propellers simultaneously can result in the UAV 1100a increasing or decreasing its altitude, respectively.

Figure 1B:
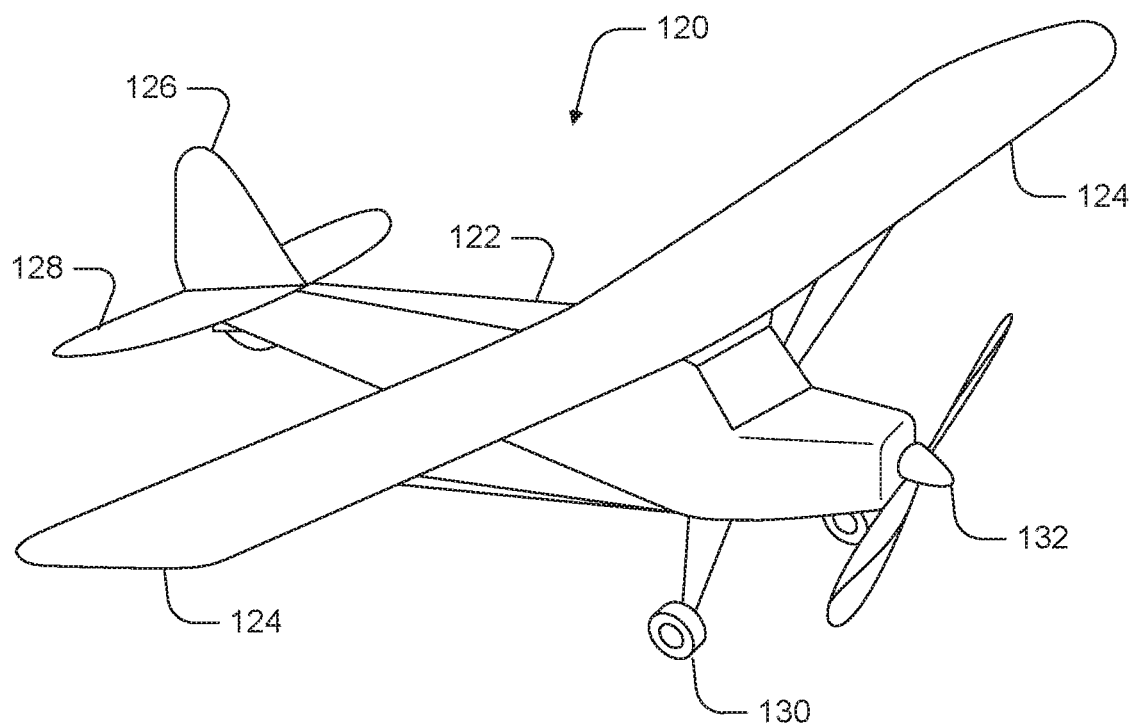
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
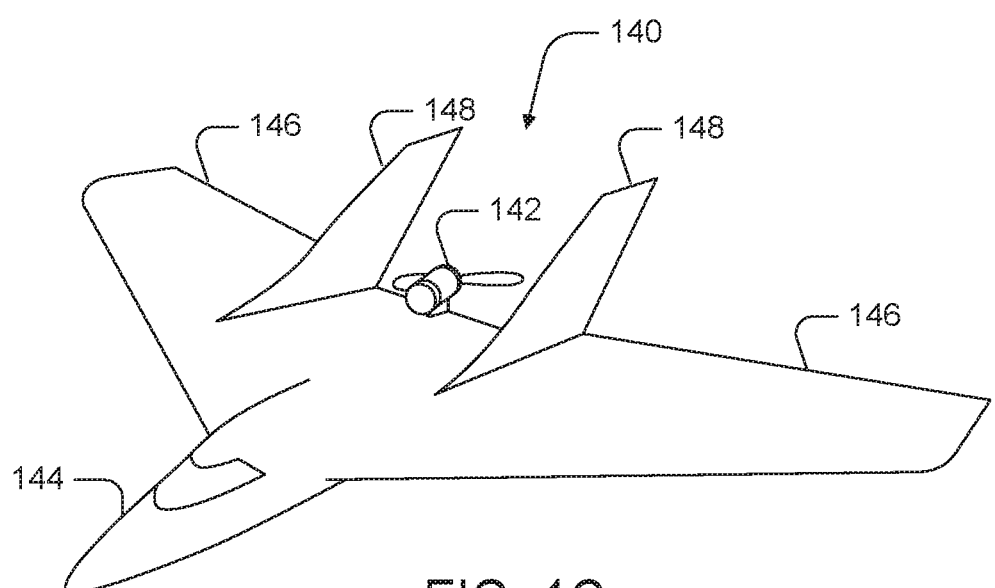
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
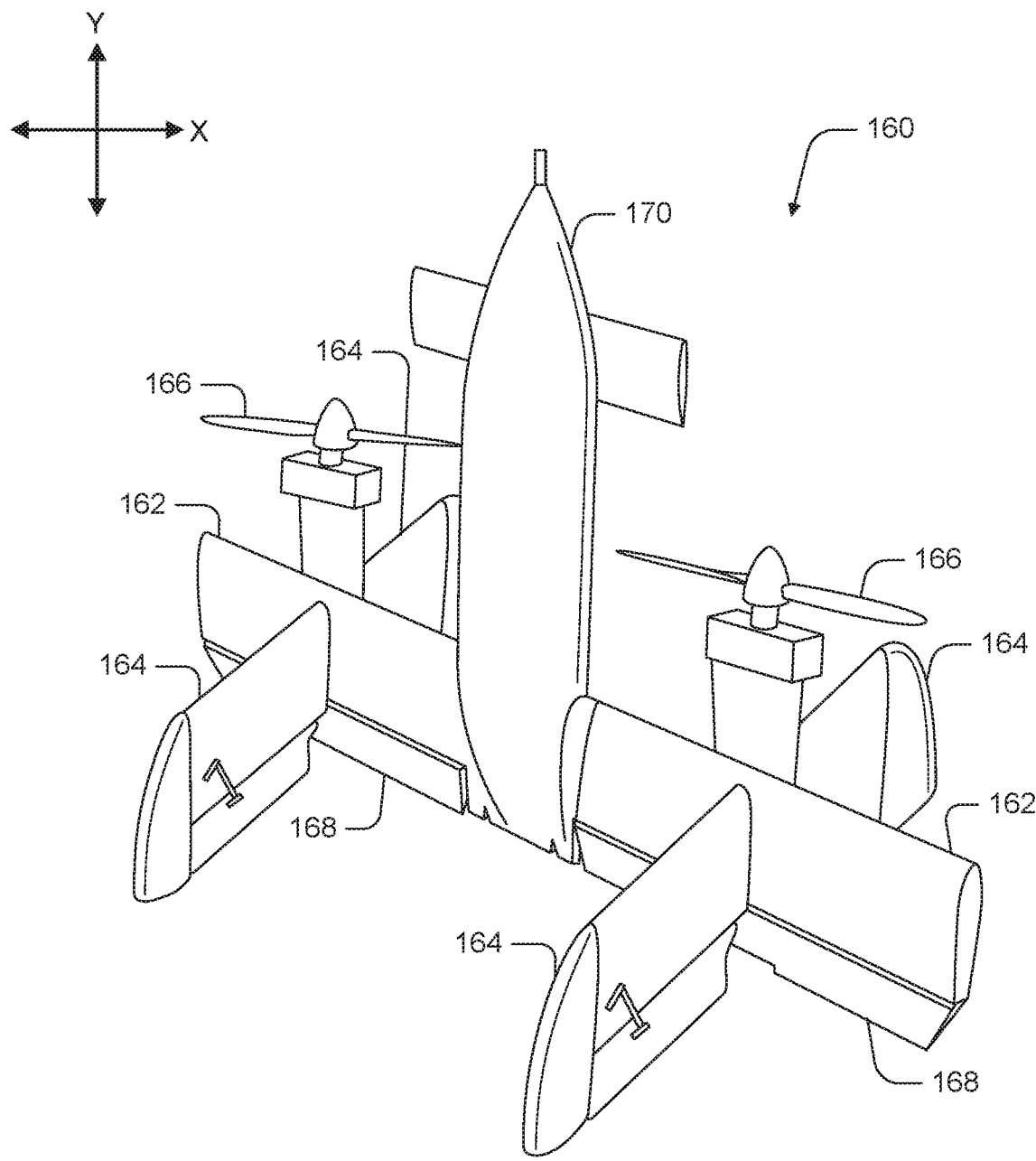
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
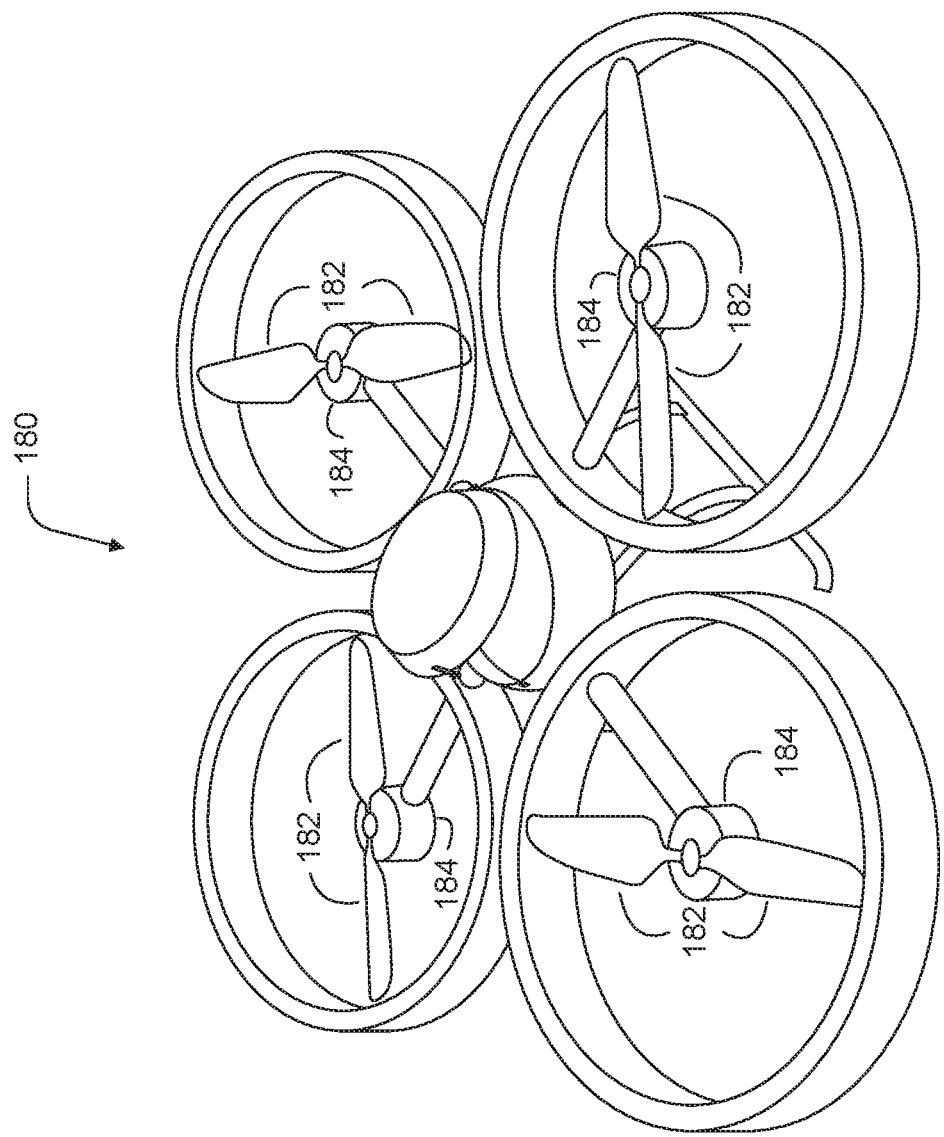
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
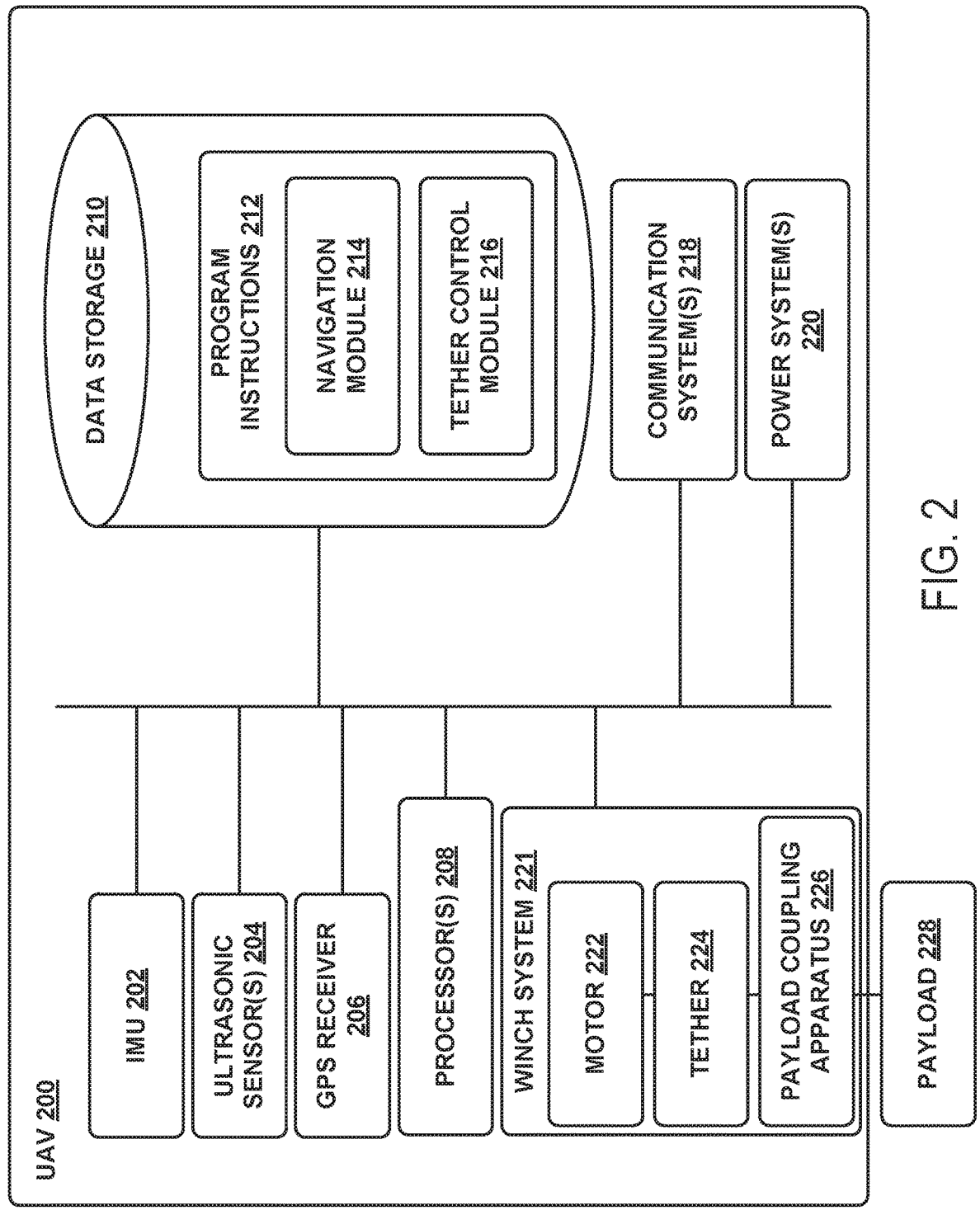
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE WING STRUCTURE DESIGN

Figure 3:
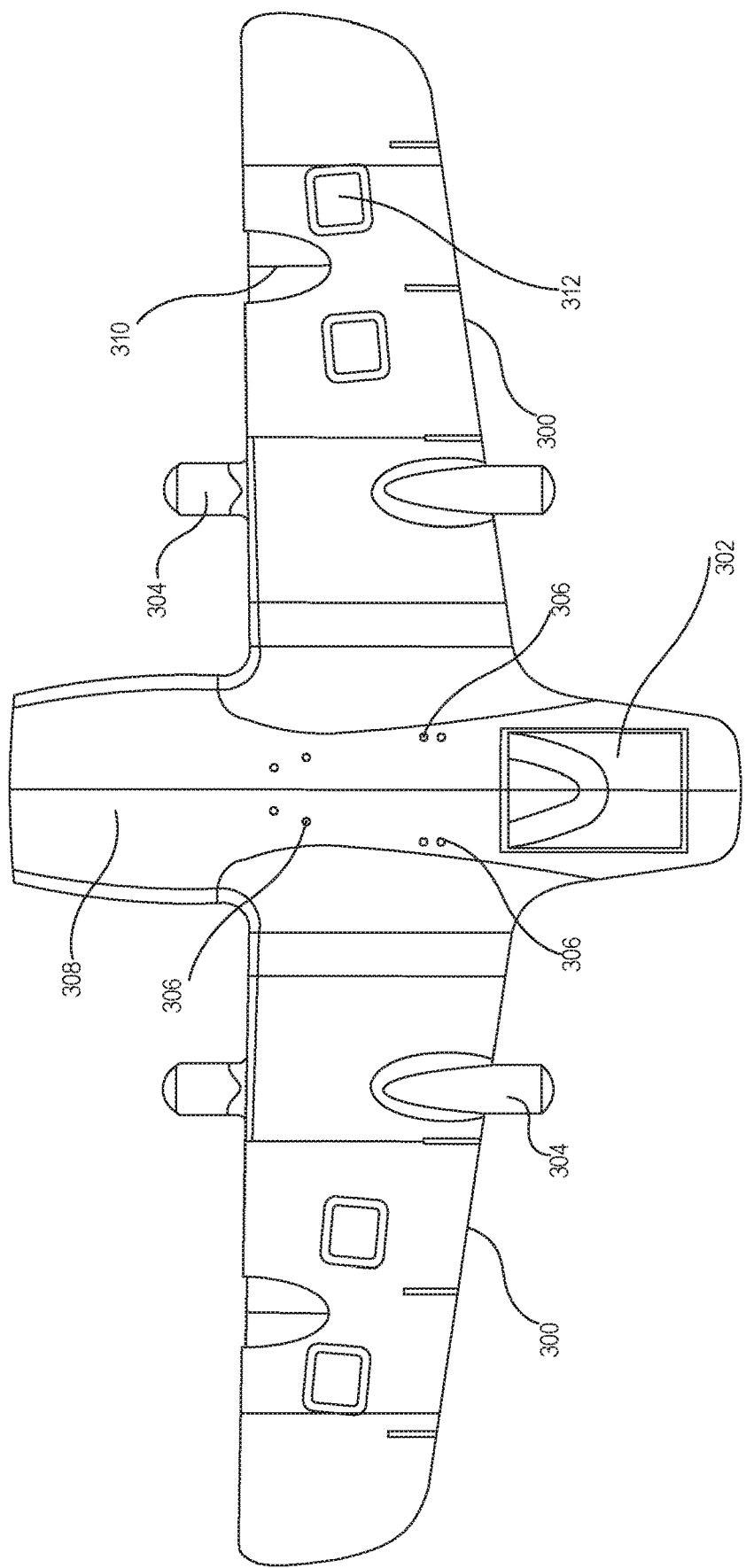
FIG. 3 is a top view of a wing structure of an aerial vehicle, according to an example embodiment.

FIG. 3 is a top view of a wing structure of an aerial vehicle, according to an example embodiment. The wing structure, 400, may include a wing frame and a body. The body may include an air-filled matrix material incorporated with the wing frame during molding. The body may substantially encase the wing frame and fill a shape of the wing structure defined by a mold. The mold may define a shape of the wing structure that includes recesses to allow for future incorporation of additional features of an aerial vehicle. For example, the wing structure may include servo pockets 312, transceiver pockets, one or more avionics pockets 302, propeller ports 310, or boom ports 304. In these examples, servos, transceivers, one or more avionics hubs, propellers, or booms may be incorporated into the wing structure after molding. Other types of recesses defined by the mold are possible as well.

Additional elements of the aerial vehicle may also be incorporated into the wing structure during molding. For example, a printed circuit board (PCB) may be incorporated into the wing structure during molding. Likewise, electrical systems of the aerial vehicle may be incorporated into the wing frame before the wing structure is molded. In other examples, any or all of the aforementioned servos, transceivers, avionics hubs, propellers, or booms may be incorporated into the wing structure during molding.

Molding the wing structure may include injecting an uncured material into the mold and allowing the material to expand around a pre-assembled wing frame as it cures. The uncured material may be a resin, or an elastomer. Other types of uncured materials are possible as well. While expanding, the uncured material may form cells of gas surrounded by the material. The gas may be an inert gas, or air. Other types of gases are possible as well. The expanded and cured material may be referred to as an air-filled matrix material. In some examples, the uncured material may not include air cells until a reaction has been activated. For example, the mold may be heated and an endothermic reaction of the uncured material may expand the material by incorporating gas into the material, allowing the material to assume the shape of the mold. In other examples, the uncured material may expand as it is injected.

The wing structure may also include mounting elements that allow for additional features of the aerial vehicle to be incorporated into the wing structure after molding. In the present example, electrical component mounts 306 may poke through the surface of the body. The electrical component mounts may allow an electronic feature to connect to the molded wing. For example, electrical components may be snapped, soldered, or otherwise coupled to the wing structure via the electrical mounting components.

The wing structure may also include a wing center 308. The wing center 308 may incorporate portions of a fuselage of the aerial vehicle. In the present example, the avionics pocket 302 may be a portion of the fuselage. In these examples, the "wing structure" may refer to one or more wings and a center that includes portions of the fuselage incorporated with the wing structure during molding. In the present example, the wing structure includes two wings 300 extending from a wing center 308, which includes avionics hub 302. Other configurations are possible as well.

Figure 4:
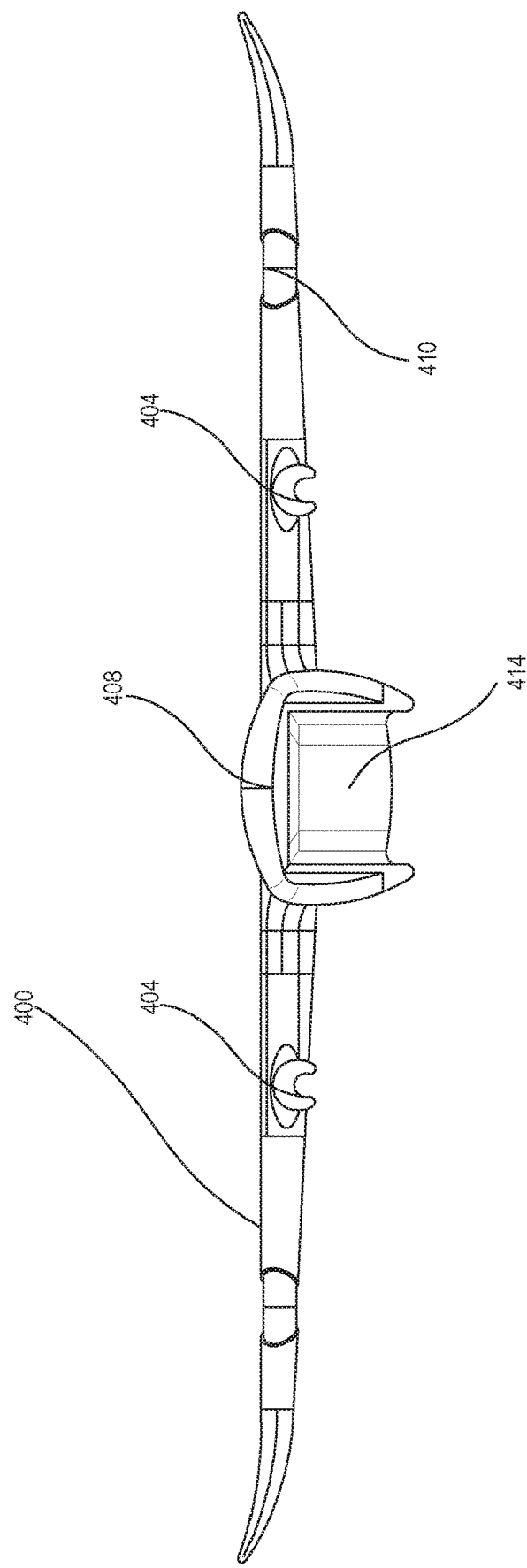
FIG. 4 is a front view of a wing structure of an aerial vehicle, according to an example embodiment.

FIG. 4 is a front view of a wing structure of an unmanned aerial vehicle, according to an example embodiment. The wing structure may include two wings 400, a wing center 408, a battery recess 414, one or more boom ports 404, and one or more propeller ports 410. The battery recess 414 may be a portion of the fuselage, which may be incorporated with the wing structure during molding. For example, the mold may define a shape of the wing structure and portions of the fuselage. In other examples, the wing structure may be incorporated with the fuselage in its entirety during molding. Though the present example shows portions of the fuselage that are incorporated with the wing structure, the wing structure may be molded separately from the fuselage as well. For example, the wing structure may be couplable to a separately molded fuselage. In these examples, the wing structure may also include fuselage mounting elements that are incorporated with a wing frame of the wing.

Figure 5:
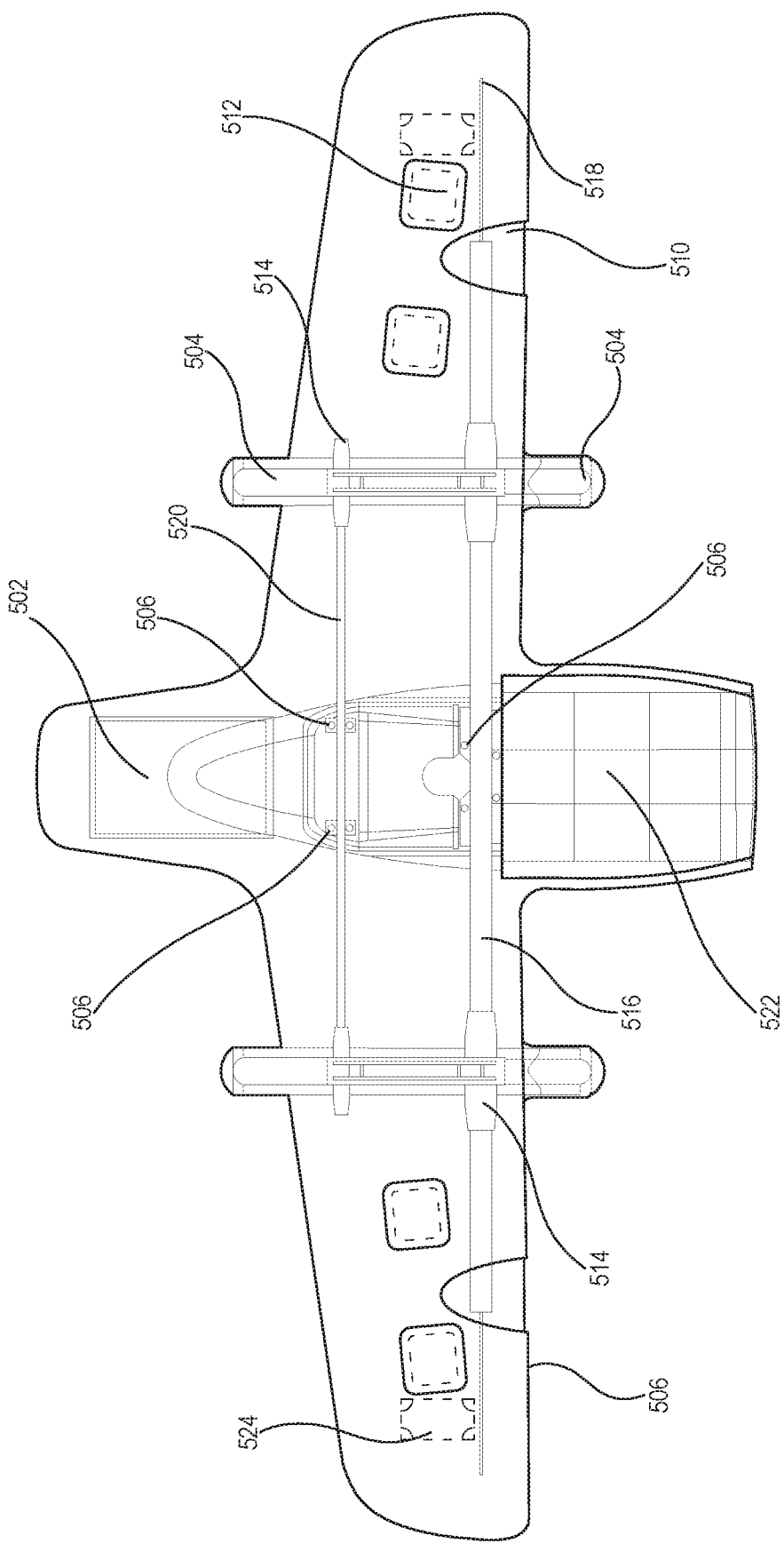
FIG. 5 is a transparent bottom view of a wing structure of an aerial vehicle, according to an example embodiment.

FIG. 5 is a transparent bottom view of a wing structure of an unmanned aerial vehicle, according to an example embodiment. The wing structure may include a wing frame. The wing frame may include a primary spar 516 and a plurality of transverse frame elements 514. The transverse frame elements may be coupled to the primary spar prior to molding of the wing structure. In the present example, the transverse frame elements include a pair of spar joiners. The spar joiners may connect the primary spar to one or more secondary spars. In the present example, the spar joiners connect the primary spar to a drag spar. The wing frame may provide stability to the wing. For example, the transverse frame elements may transfer drag loads from the drag spar to the primary spar. The wing frame may also assume thrust, lift, and weight loads of the aerial vehicle.

In some examples, the wing structure may include portions of the fuselage. In these examples, the primary spar may span the fuselage. In some examples, the primary spar may include one piece that spans that fuselage. A fuselage-spanning primary spar may provide stability to both ends of the wing, while also providing structural support to the fuselage. In other examples, the primary spar may include a plurality of pieces coupled together. For example, the primary spar may include two pieces that provide stability to each end of the wing, and each of the two pieces may couple to an internal support structure of the fuselage. Other configurations of a primary spar are possible as well.

In some examples, the fuselage-spanning primary spar may substantially span the wing structure. For example, the primary spar may span about 800 millimeters from end to end, while the wing structure may span about 1 meter from end to end. In other examples, the spar may span a larger percentage of the wing structure. Similarly, the transverse frame elements may substantially span the wing structure. For example, the transverse frame elements may span about 400 millimeters from nose to tail, while the wing structure may span about 500 millimeters from nose to tail. Other dimensions of the wing structure and frame elements are possible as well.

In some examples, the wing frame may also include one or more spar tips 518 coupled to the primary spar 516. The spar tips may translate forces from the wing tips to the primary spar while also allowing the wing tips to flex. The wing frame may further include mounting elements. For example, the transverse frame elements may also serve as mounting elements. In the present example, the spar joiners 514, in addition to connecting the drag spar 520 to the primary spar 516, serve as boom joiners. In other examples, the transverse frame elements may include ribbed features. The ribbed features may have a tangential relationship with an airfoil of the wing. For example, the ribbed features may substantially span the wing structure from a leading edge of the wing structure to a trailing edge of the wing structure.

In additional examples, the mounting elements may be coupled to other components of the wing frame. For example, the mounting elements may also include electrical component mounts 506. The electrical mounting components may be coupled to other elements of the wing frame. In the present example, electrical component mounts 506 are coupled to the primary spar 516 and to the drag spar 520. In other examples, however, the mounting elements may be incorporated into parts of the frame in a similar fashion to the boom joiners of 514 in the present example.

The wing structure may incorporate additional components of the aerial at various stages of manufacture. For example, in the present example, the wing frame may include the primary spar 516, the spar joiners 514, the drag spar 520, the spar tips 518, and the electrical component mounts 506. These parts of the wing may be incorporated prior to molding the wing. These parts of the wing may be incorporated by coupling them together. In some examples, various components may serve multiple functions, such as the spar joiners 614 that serve as transverse frame elements and mounting elements. In other examples, the wing frame may be one large piece. For example, the wing frame may be a component configured to serve all the purposes of the primary spar, transverse frame elements, and mounting elements.

In some examples, the frame elements may all be composed of a stiff material, such as carbon or a metal. In other examples, some of the components may be composed of stiff materials, while other components may be composed of flexible materials. For example, the primary spar 516 may be composed of carbon, while the spar tips 518 may be composed of fiberglass or a polymer material.

Additional components may be incorporated into the wing structure while the wing frame is molded. For example, electrical systems may be incorporated with the wing frame and comolded with the wing frame. Other components may be incorporated during the molding as well. For example, a battery housing 522 may be incorporated during molding.

Additional components may also be incorporated after the wing structure has been molded. For example, propellers, booms, one or more avionics hubs, transceivers, and servos may be incorporated into the wing structure after molding. Other components may be incorporated after molding as well. In these examples, electrical systems of the aerial vehicle that may have been incorporated into the wing structure during molding may have leads that pierce the surface of the molded wing such that the electrical components may be electrically coupled to the wing. When additional components are incorporated after molding, the wing structure may include molded features. The molded features may include recesses that allow incorporation of other components after molding. For example, the mold may define a shape of the wing that includes propeller ports 510, boom ports 504, one or more avionic pockets 502, one or more transceiver pockets 524, one or more servo pockets 512, or any combination thereof.

Some of these molded features may allow additional components of the aerial vehicle to be incorporated with the wing structure via the mounting elements of the frame. In the present example, the boom ports 504 may allow booms to be attached to the transverse frame elements/boom joiners 514. Additional components may be incorporated with frame elements themselves. For example, propellers may have access to the primary spar 516 via the propeller ports 510, and may couple directly to the primary spar. Additional components may also simply incorporate with features of the wing body. For example, transceivers may be incorporated into the one or more transceiver pockets 524, and servos may be incorporated into the one or more servo pockets 512. In these examples, the components may be incorporated into recesses in the wing body. Further, in these examples, the wing body may include one or more plugs that cover the components placed into the recesses. For example, an avionics hub may be incorporated into avionics pocket 502. An avionics plug may cover the avionics hub to shield it from outside forces and to hold the avionics hub in place during flight.

To form the wing structure, the assembled frame may be placed, suspended, or otherwise introduced into a mold. The mold may be injected with an uncured material. The uncured material may be cured to form an air-filled matrix material. In some examples, the air-filled matrix material may include a foam. In other examples, the air-filled matrix material may include a gas-filled polymer matrix. Other air-filled matrix materials are possible as well.

The mold may define a shape of the wing. For example, the mold may define an airfoil of one or more wings of the wing structure, recesses for additional components of the aerial vehicle, or portions of a fuselage. The mold may define other features as well. In some examples, the mold may not define the entire shape of the wing. For example, the mold may define recesses for structural components that may be incorporated later. In some examples, the mold may leave room for wing flaps, fins, or other components, that, when installed, may complete the shape of the wing.

The injected uncured material may form the body of the wing by filling the defined shape of the wing structure and substantially encasing the wing frame as it cures. Further, during the molding process, certain features of the wing frame may be shielded from the uncured material. For example, portions of the primary spar 516 may be shielded from the uncured material as it cures. In the present example, the propeller ports 510 may be shielded to allow propellers to couple directly to the primary spar 516. In other examples, the mounting elements 506 and 514 of the frame may be shielded during the molding process. In the present example, the boom ports 504 may be partially defined by a plug or insert that may be removed after the molding process to expose the boom joiners of the transverse frame elements 514. In other examples, a shielding material may be used during the molding process, so that, one the wing structure is removed from the wing, the shielding material may be removed to expose the mounting elements. In the present example, the electronic component mounts 506 may be protected with a shielding material during the molding process, and may be exposed afterwards for coupling to electronic components.

Once the uncured material is injected into the mold, it may be allowed to cure to form an air-filled matrix material. The air-filled matrix material may form the body of the wing. The body may surround the wing frame such that the wing frame is fixedly encased in a single piece of the air-filled matrix material of the body. The relationship between the wing frame and the body may be such that the plurality of transverse frame elements provide torsional rigidity to the wing structure and such that separating the encased wing frame from the body has an internecine effect. For example, the surface of the wing structure may endure lift loads, weight loads, and drag loads. The wing body may transfer those loads to the transverse frame elements 614, which may in turn transfer the loads to the primary spar 516. This may allow the body to twist less along a lateral axis of the aerial vehicle and bend less across a longitudinal axis of the wing.

In some examples, the uncured material may contract while curing. In these examples, the mold may be designed to compensate for the shrinking during curing. In other examples, a wing skin may be formed. The wing skin may compensate for the reduced size of the wing structure due to contraction of the body during curing. The formed wing skin may be applied to the wing body such that it substantially surrounds the wing. The wing skin may be a polymer material, a rubberized material, or a fiberglass. Other materials are possible as well. The wing skin may further protect the wing structure from weather and supply additional support to the wing. Further, a wing skin may be used regardless of shrinking during curing of the uncured material to supply the aforementioned properties.

Figure 6:
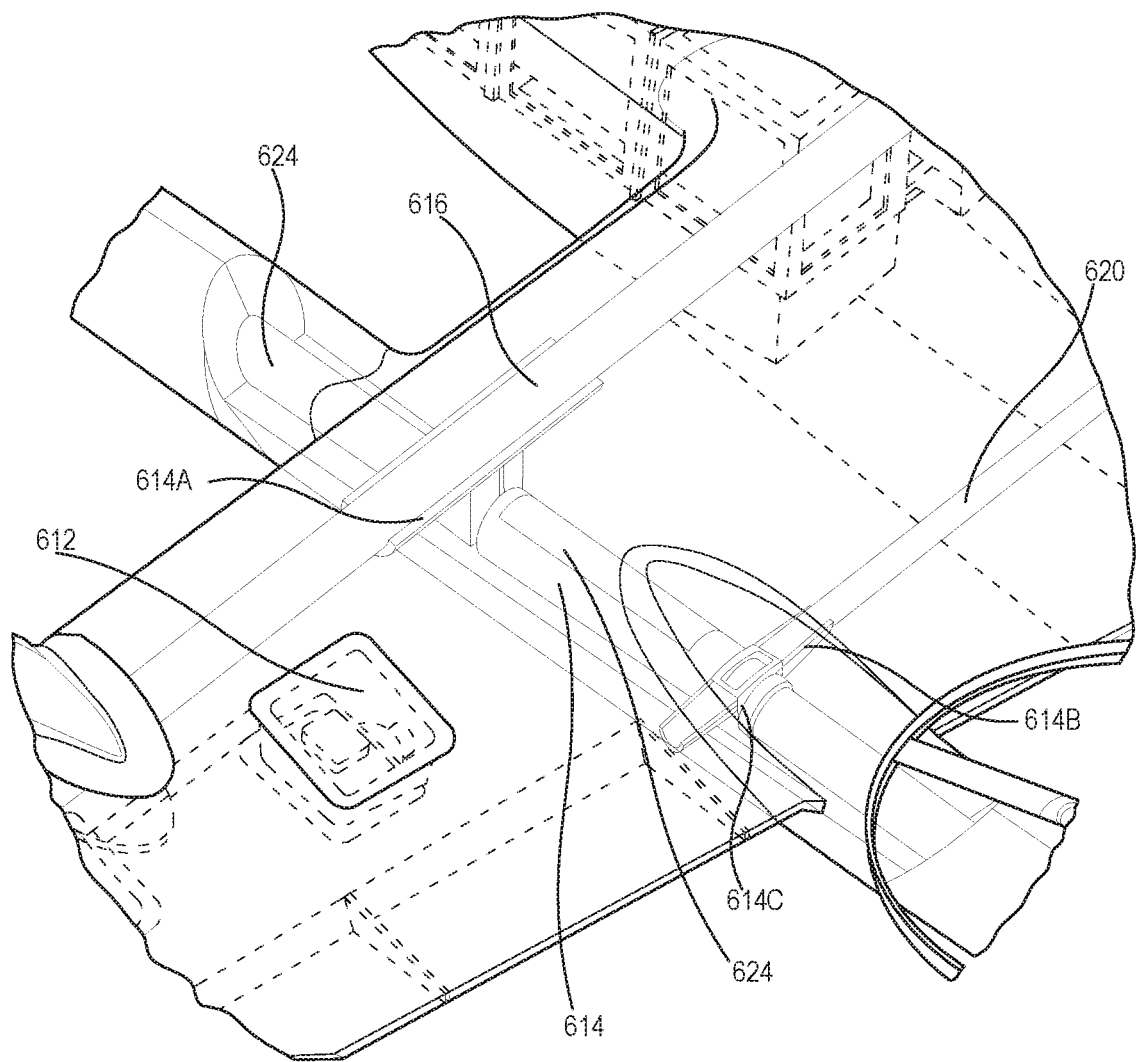
FIG. 6 is a detail view of components of a wing frame of a wing structure, according to an example embodiment.

FIG. 6 is a detail view of components of a wing frame of a wing structure, according to an example embodiment. Specifically, FIG. 6 illustrates how components of the wing frame may serve multiple purposes. In the present example, transverse frame element 614 serves as a spar joiner. Primary spar joiner 614A connects to primary spar 616. Secondary spar joiner 614B connects to secondary spar 620. Further, transverse frame element 614 also serves as a mounting element. In the present example, boom joiner, 614C of transverse frame element 614 connects to boom 624. In the present example, the boom is inserted through boom joiner 614C. However, the booms may connect to the boom joiners in other ways. For example, the booms may snap into the boom joiners. In other examples, the booms may screw into the boom joiners. In still other examples, the booms may magnetically couple to the boom joiners. Other connections between the booms and boom joiners are possible as well.

FIG. 6 additionally illustrates an example configuration of a recess in the wing body. In the present example, servo pocket 612 may be configured to snugly fit an incorporated servo. The mold may be configured to account for the sizes and shapes of specific components to be incorporated with the wing structure post-molding. Further, plugs that are inserted atop the incorporated elements may be designed similarly. The plugs may also include an air-filled matrix material, or may be composed of a different material. The mold may also define shapes to assist in incorporating the plugs. For example, the mold may define a lip for each plug. The lip may include a sealant. For example, the sealant may water-proof the recess filled by the incorporated component and the plug.

Figure 7:
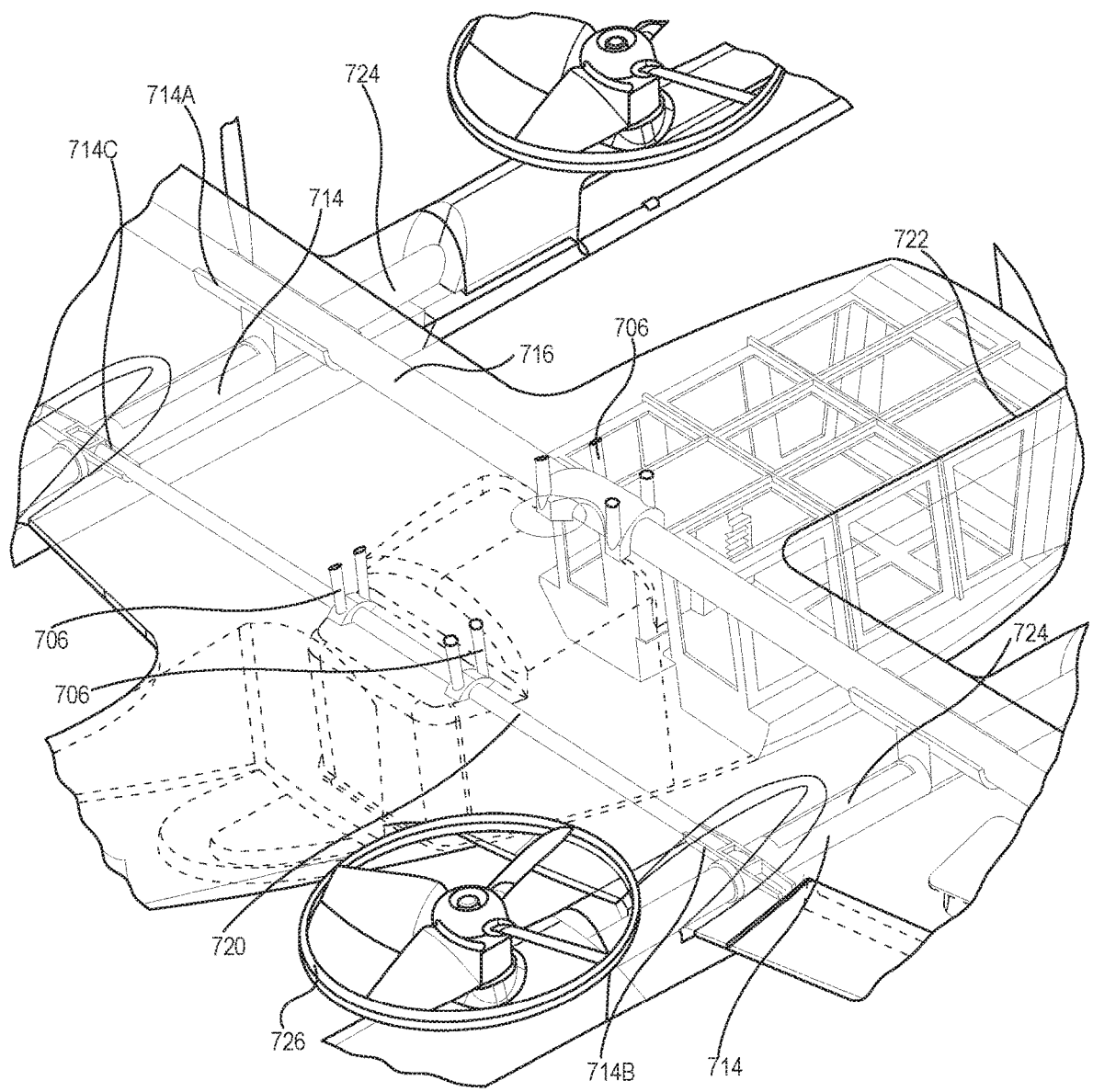
FIG. 7 is a detail view of components of a wing structure of an aerial vehicle, according to an example embodiment.

FIG. 7 is a detail view of components of a wing of an unmanned aerial vehicle, according to an example embodiment. Specifically, FIG. 7 illustrates the relationship between the components of a wing frame, between the wing frame a body, and between the body and various components incorporated with the wing, according to an example embodiment. In the present example, fuselage-spanning primary spar 716 is substantially parallel with secondary spar 720. The transverse frame elements 714 are also substantially parallel to one another. Further, the transverse frame elements are configured to suspend the spars 716 and 720 above portions of the fuselage. In the present example, the transverse frame elements 714 also serve as spar joiners 714A and 714B coupled to the primary spar 716 and secondary spar 720. Further, electrical component mounts 706 are coupled to the spars 716 and 720.

In the present example, certain components have been incorporated into the wing. For example, a battery housing 722 is incorporated into the wing body. The battery housing 722 is incorporated as a portion of a fuselage of a aerial vehicle. Further, a pair of booms 724 have been incorporated into the wing. In the present example, the booms have been inserted through boom ports of the wing body and through the boom joiners 714C of the transverse frame elements 714. Also depicted in the present example are propellers 726 coupled to the booms.

In some examples, the booms may support a plurality of propellers. The propellers may generate lift, which may be translated to the wing structure through the booms 724 and the boom joiners 714C. For example, the booms may include a total of twelve propellers, six of the twelve propellers being distributed among each of the two booms. Each of the twelve propellers may generate lift, and thereby suspend or accelerate the aerial vehicle. Other numbers of propellers are possible as well. Other numbers of booms are possible as well. In some examples, no booms may be present at all, and propellers coupled to the wing structure may account for lift. In still other examples, the wing structure may include propellers and the booms may include propellers. In these examples, the propellers of the wing structure may primarily account for thrust, while the propellers of the wing may primarily account for lift.

Electrical components in the booms 724, such as propellers 726, may be electrically connected to the wing. For example, an electrical system incorporated in the wing structure may have leads to which the propellers 726 may couple. This way, a power source located in the wing, such as a battery of battery housing 722, may power propellers 726 coupled to the booms. Control signals from one or more processors of the wing structure may control the propellers in much the same way.

Figure 8:
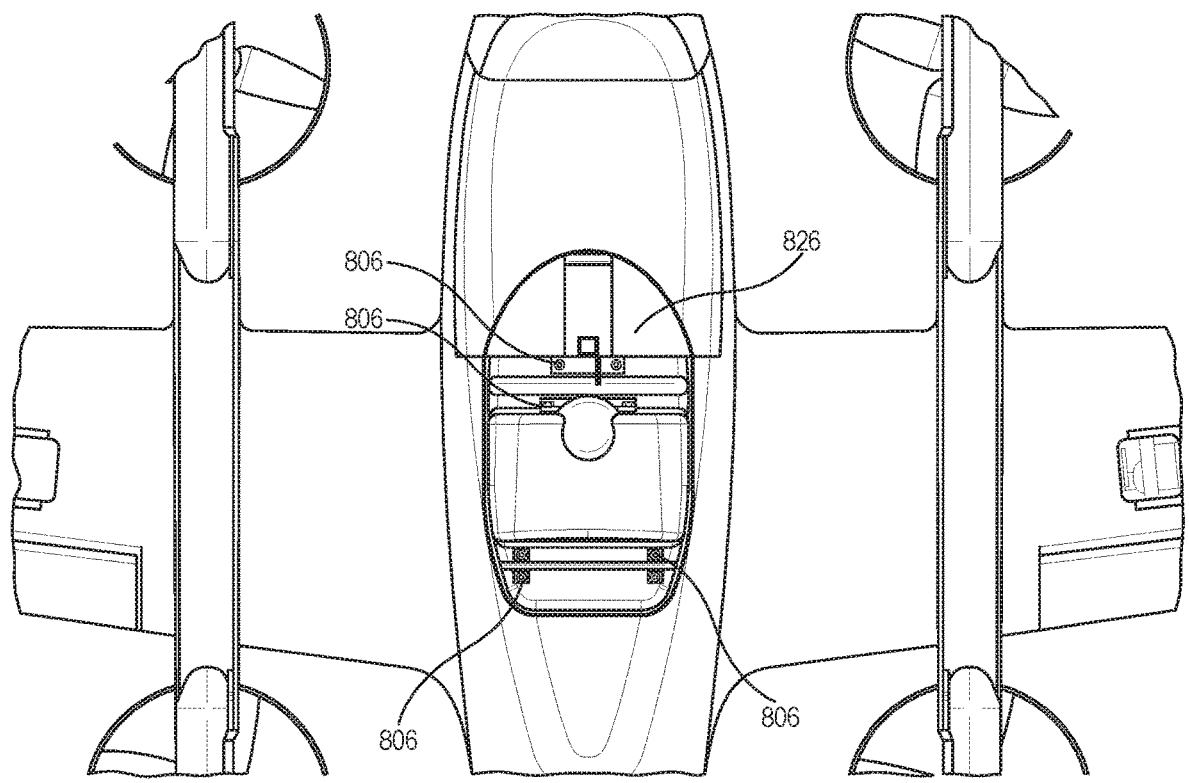
FIG. 8 is a bottom view of a portion of a wing structure of an aerial vehicle, according to an example embodiment.

FIG. 8 is a bottom view of a portion of a wing structure of an aerial vehicle, according to an example embodiment. Specifically, FIG. 8 illustrates an example of an electrical component incorporated into a wing via mounting elements of an assembled and molded wing. In the present example, the electrical component is a voltage suppression device 826, which is clipped to electrical component mounts 806. In other examples, different types of electrical components may be incorporated into the wing. For example, servos or sensors may be snapped, soldered, or otherwise coupled to electrical component mounts of the frame.

Figure 9:
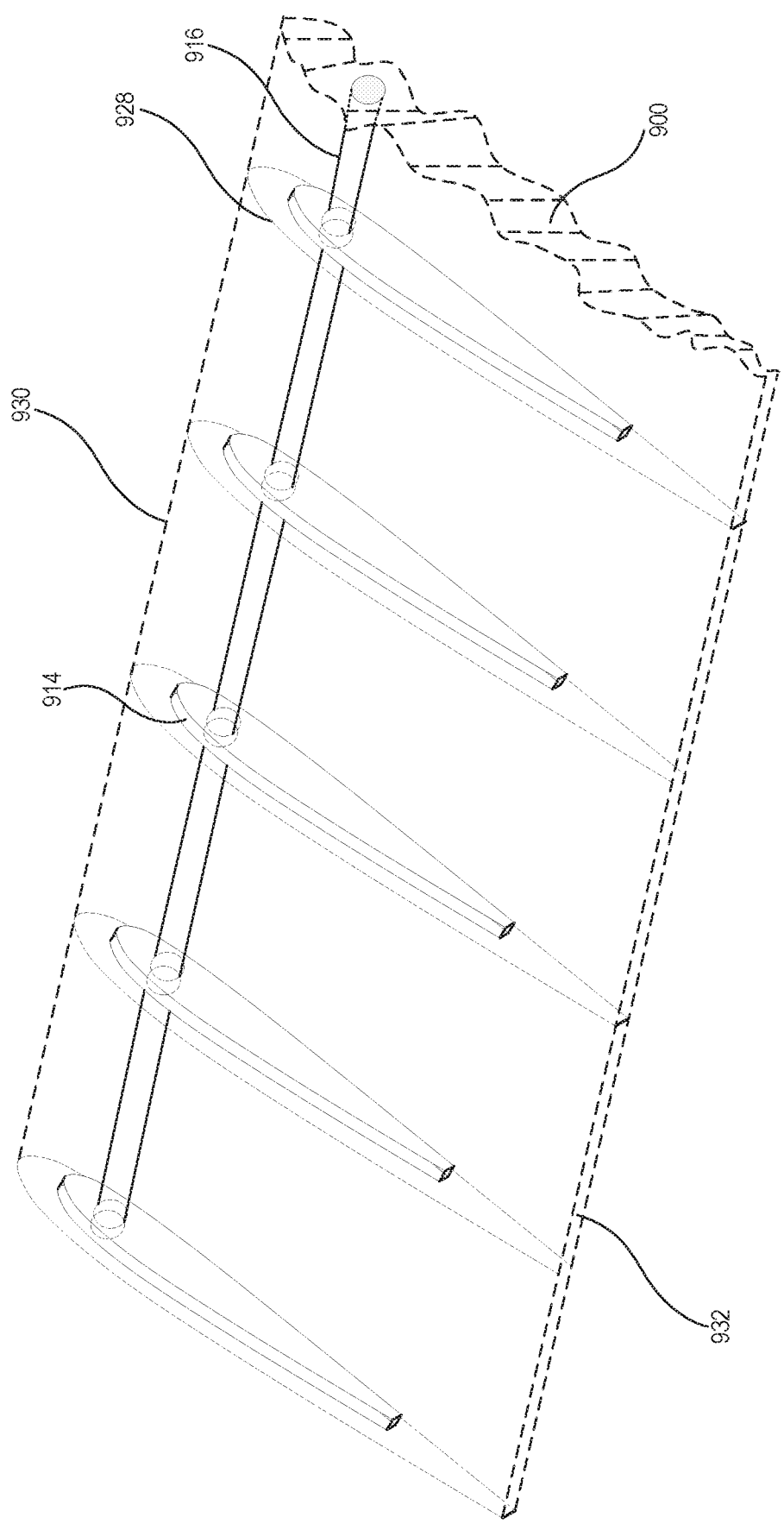
FIG. 9 is a perspective view of a portion of a wing structure of an aerial vehicle, according to another example embodiment.

FIG. 9 is a perspective view of a portion of a wing of an aerial vehicle, according to another example embodiment. In the present example, the wing frame includes a primary spar 916 and transverse frame elements 914. However, unlike the examples presented in FIGS. 5-7, the transverse elements include a plurality of ribbed features. The ribbed features may be tangentially related to an airfoil 928 of the wing. In the present example, the ribbed features 914 substantially span a leading edge of the wing 930 to a trailing edge of the wing 932. In examples where the transverse frame elements include ribbed features, the provide torsional rigidity to the wing by translating lift, weight, and drag loads to the primary spar. Other kinds of transverse frame elements may be used in conjunction with the ribbed features. For example, the transverse frame elements of FIGS. 5-7 may also be used. Other types of transverse frame elements may be used as well.

Figure 10:
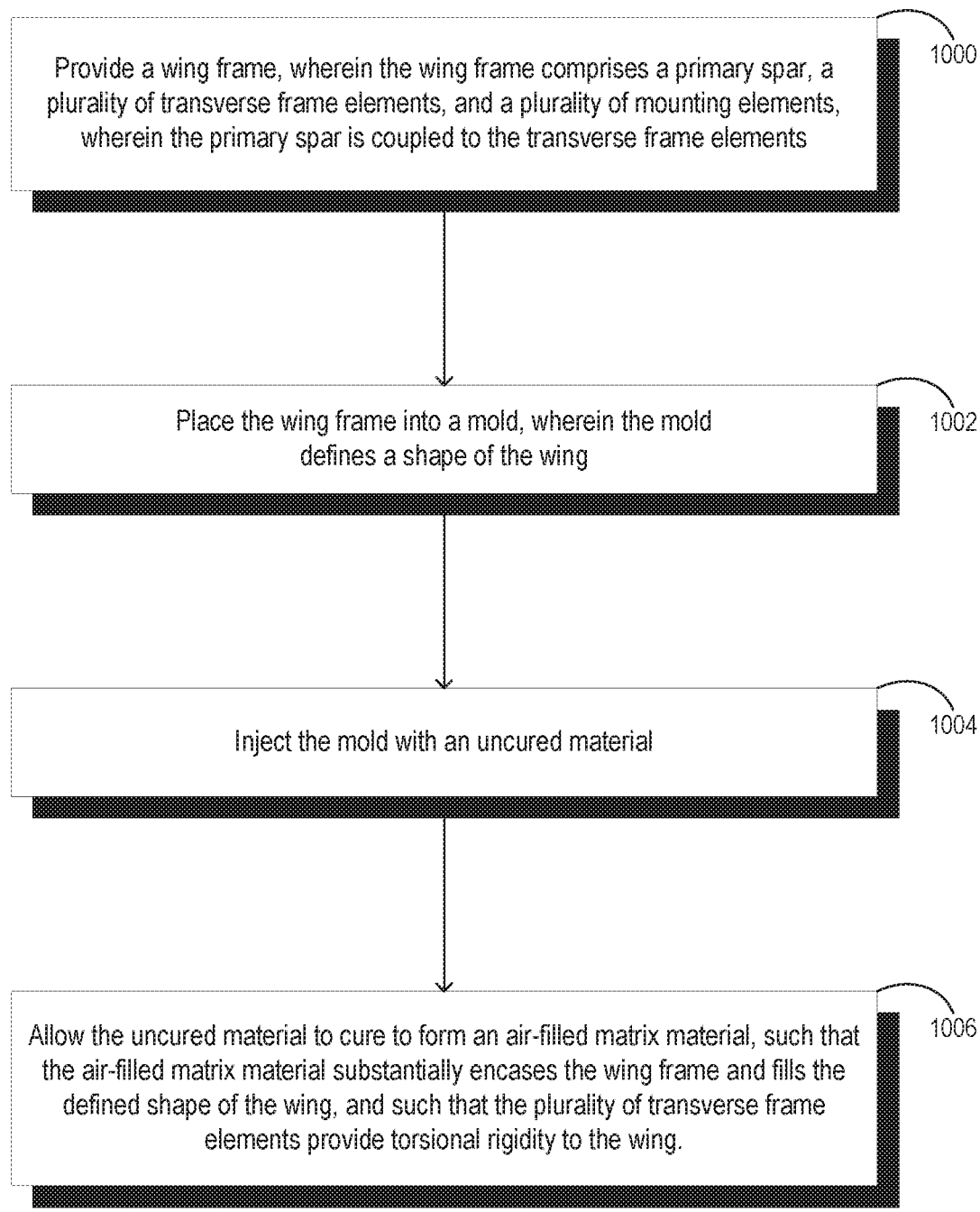
FIG. 10 is a block diagram of a method of manufacturing a wing structure, according to an example embodiment.

FIG. 10 is a block diagram of a method of manufacturing a wing structure, according to an example embodiment. Block 1000 of the method may be performed to provide a wing frame, wherein the wing frame comprises a primary spar, a plurality of transverse frame elements, and a plurality of mounting elements, wherein the primary spar is coupled to the transverse frame elements. Further, Block 1002 of the method may be performed to place the assembled wing frame into a mold, wherein the mold defines a shape of the wing. Still further, Block 1004 of the method may be performed to inject the mold with an uncured material. Additionally, Block 1006 of the method may be performed to allow the uncured material to cure to form an air-filled matrix material, such that the air-filled matrix material substantially encases the wing frame and fills the defined shape of the wing, and such that the plurality of transverse frame elements provide torsional rigidity to the wing.

Once the uncured material has cured to form the air-filled matrix material, the wing frame may be fixedly encased in a single piece of the air-filled matrix material. Being substantially encased in this way may make the wing frame substantially inseparable from the body. For example, removing the wing frame from the body may have an internecine effect. In some examples, removing the frame may bend, distort, or break the wing frame, or any components thereof. In other examples, removing the frame may cause rending, tearing, or breaking of cells of the air-filled matrix material.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A wing, comprising:
a wing frame, wherein the wing frame comprises a primary spar, a plurality of transverse frame elements, a secondary spar parallel to the primary spar, and a plurality of mounting elements configured to couple one or more components to the wing, wherein the plurality of transverse frame elements are each coupled between the primary spar and the secondary spar, and wherein the plurality of mounting elements are each part of a transverse frame element; and
a body, wherein the body comprises an air-filled matrix material;
wherein the wing frame is fixedly encased in a single piece of the air-filled matrix material of the body such that the plurality of transverse frame elements provide torsional rigidity to the wing and such that separating the encased wing frame from the body has an internecine effect, and wherein the mounting elements are exposed via openings in the body.

2. The wing of claim 1, wherein the internecine effect of separating the encased wing frame from the body comprises breaking cells of the single piece of the air-filled matrix material of the body.

3. The wing of claim 1, wherein the air-filled matrix material is a foam material.

4. The wing of claim 1, wherein the mounting elements comprise at least one electrical component mount coupled to the wing frame.

5. An aerial vehicle, comprising:
a wing;
a fuselage;
a plurality of booms coupled to the wing; and
a plurality of propellers coupled to the plurality of booms;
wherein the wing comprises a wing frame and a body;
wherein the wing frame comprises:
a primary spar;
a plurality of transverse frame elements coupled to the primary spar; and
a plurality of mounting elements coupled to the primary spar, and
wherein the body comprises an air-filled matrix material;
wherein the wing frame is fixedly encased in a single piece of the air-filled matrix material of the body such that the plurality of transverse frame elements provide torsional rigidity to the wing and such that separating the encased wing frame from the body has an internecine effect, and
wherein the mounting elements are substantially embedded in the air-filled matrix material, wherein the booms are connected to the mounting elements via boom ports in the air-filled matrix material that expose the mounting elements, and wherein the booms are connected to the frame via the mounting elements.

6. The aerial vehicle of claim 5, wherein the plurality of booms coupled to the wing comprise a pair of booms.

7. The aerial vehicle of claim 6, wherein the plurality of propellers coupled to the plurality of booms comprise twelve propellers, wherein six of the propellers are coupled to each of the pair of booms.

8. The aerial vehicle of claim 5, wherein at least a portion of the fuselage and the wing body comprise a single piece of air-filled matrix material.

9. The aerial vehicle of claim 5, wherein the mounting elements of the wing comprise a plurality of boom joiners, and the plurality of booms are coupled to the wing via the plurality of boom joiners.

10. The aerial vehicle of claim 5, wherein the wing frame further comprises a secondary spar parallel to the primary spar, wherein the plurality of transverse frame elements are each coupled to both the primary spar and the secondary spar, and wherein the transverse frame elements also serve as one or more of the plurality of mounting elements.

11. The aerial vehicle of claim 5, wherein the mounting elements comprise at least one electrical component mount.

\* \* \* \* \*